US012105679B2

(12) United States Patent
Bare, II et al.

(10) Patent No.: US 12,105,679 B2
(45) Date of Patent: Oct. 1, 2024

(54) REMOTE CLONING OF FILES IN DISTRIBUTED FILE SYSTEMS

(71) Applicant: NetApp, Inc., San Jose, CA (US)

(72) Inventors: Keith Allen Bare, II, Ross Township, PA (US); Richard Parvin Jernigan, IV, Sewickley, PA (US); Asish Prabhakar Kottala, Cranbery Township, PA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/193,707

(22) Filed: Mar. 31, 2023

(65) Prior Publication Data

US 2024/0061816 A1 Feb. 22, 2024

Related U.S. Application Data

(60) Provisional application No. 63/399,601, filed on Aug. 19, 2022.

(51) Int. Cl.
| | |
|---|---|
| *G06F 16/10* | (2019.01) |
| *G06F 16/16* | (2019.01) |
| *G06F 16/182* | (2019.01) |
| *G06F 16/23* | (2019.01) |

(52) U.S. Cl.
CPC ........ *G06F 16/1844* (2019.01); *G06F 16/162* (2019.01); *G06F 16/182* (2019.01); *G06F 16/2365* (2019.01); *G06F 16/2379* (2019.01)

(58) Field of Classification Search
CPC ............... G06F 16/162; G06F 16/1844; G06F 16/2365; G06F 16/2379
See application file for complete search history.

(56) References Cited

U.S. PATENT DOCUMENTS

| | | | | |
|---|---|---|---|---|
| 9,934,241 | B2 * | 4/2018 | Duval | G06F 16/176 |
| 2004/0268244 | A1 * | 12/2004 | Levanoni | G06F 16/8373 |
| | | | | 707/E17.132 |
| 2009/0300169 | A1 * | 12/2009 | Sagar | H04L 67/1095 |
| | | | | 709/224 |

(Continued)

OTHER PUBLICATIONS

Co-pending U.S. Appl. No. 18/194,860, inventors Rajasekaran; Umeshkumar Vasantha et al., filed Apr. 3, 2023.

(Continued)

*Primary Examiner* — Mahesh H Dwivedi
(74) *Attorney, Agent, or Firm* — Jaffery Watson Hamilton & DeSantis LLP

(57) ABSTRACT

Approaches and mechanisms for cloning a file are described. A first node requests a clone of a file at a time when it also requests an exclusive delegation of the original file from a second node where the original file is stored. The second node marks the original file as delegated to the first node and the second node records an intent to create the clone file and a delegation record for the clone file. The second node creates the clone file. The delegation of and the identity of the clone file are returned to the first node. The first node marks in the delegation record that the clone file was committed in response to modification. If the clone file was committed the delegation is cleared and the clone file is kept, and if the clone file was not committed, the delegation is cleared, and the clone file is deleted.

20 Claims, 9 Drawing Sheets

(56) References Cited

U.S. PATENT DOCUMENTS

| | | | |
|---|---|---|---|
| 2010/0023631 A1* | 1/2010 | Archer | G06F 9/52 709/230 |
| 2012/0124092 A1* | 5/2012 | Teranishi | G06F 21/6218 707/783 |
| 2016/0292047 A1* | 10/2016 | Bender | G06F 11/1435 |
| 2023/0112569 A1* | 4/2023 | Blom | G06F 16/951 707/758 |

OTHER PUBLICATIONS

Co-pending U.S. Appl. No. 18/194,874, inventors Rajasekaran; Umeshkumar Vasantha et al., filed Apr. 3, 2023.

* cited by examiner

REMOTE CLONING OF FILES IN DISTRIBUTED FILE SYSTEMS

CROSS-REFERENCE TO RELATED APPLICATIONS

This application claims the priority of U.S. Provisional Application No. 63/399,601, filed Aug. 19, 2022, the contents of which are incorporated by reference herein.

BACKGROUND

A node, such as a server, a computing device, a virtual machine, etc., may host a storage operating system. The storage operating system may be configured to store data on behalf of client devices, such as within volumes, aggregates, storage devices, cloud storage, locally attached storage, etc. In this way, a client can issue a read operation or a write operation to the storage operating system of the node in order to read data from storage or write data to the storage. The storage operating system may implement a storage file system through which the data is organized and accessible to the client devices. The storage file system may be tailored for managing the storage and access of data within hard drives, solid state drives, cloud storage, and/or other storage that may be relatively slower than memory or other types of faster and lower latency storage.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
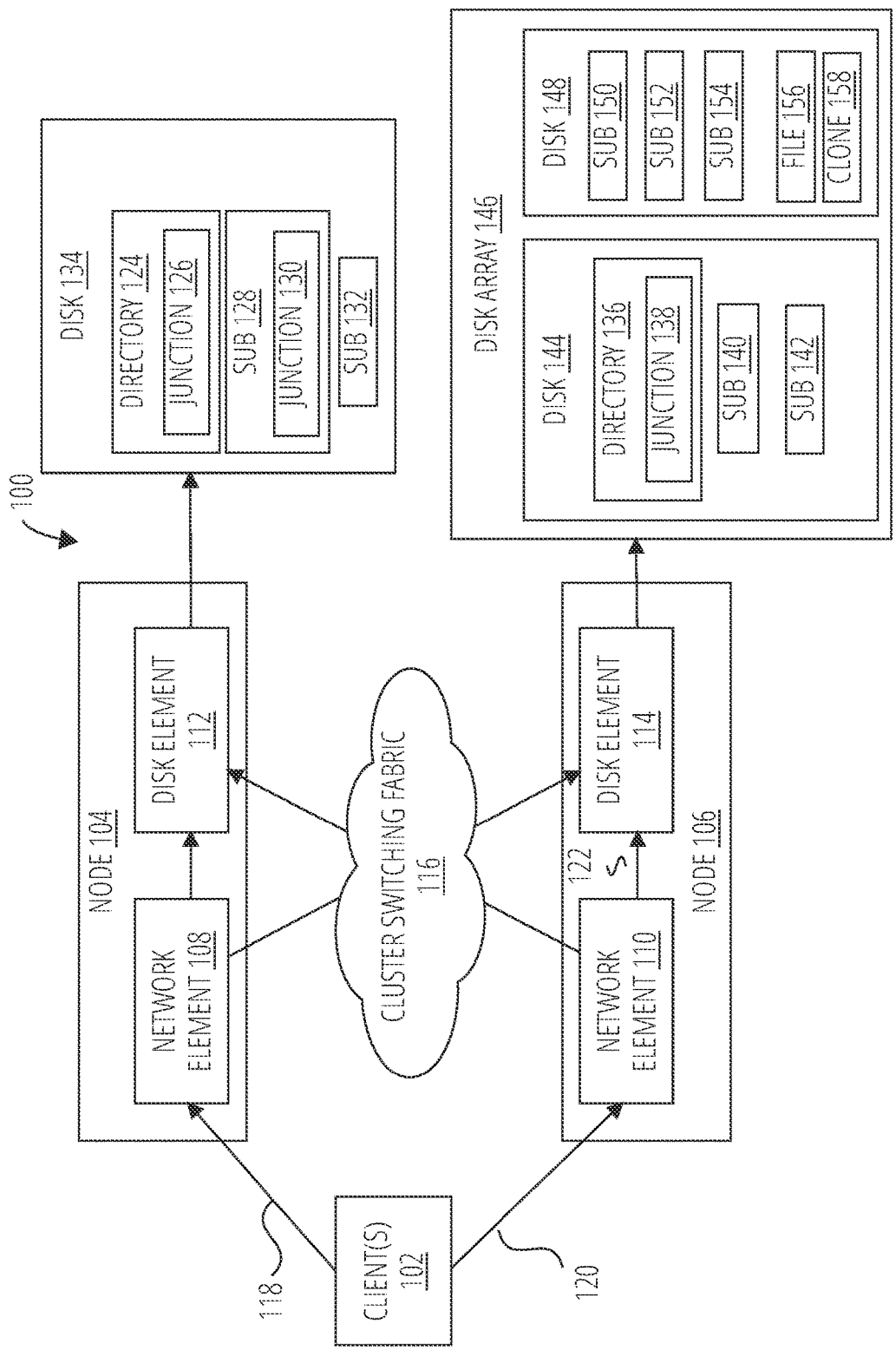
FIG. 1 illustrates one embodiment of block diagram of a plurality of nodes interconnected as a cluster.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

In a distributed file system file placement is initially performed via implementation of one or more heuristics that provide an optimal placement of newly created files on various nodes throughout the distributed system. At some point, files placed on the nodes may be cloned. A file clone is an independent copy of existing content, but which is highly storage efficient—typically sharing the same back-end storage for all portions of the content which are not subsequently changed in either resulting copy. Cloning is typically implemented to deploy a new service that has a base configuration as an original service. Typically, a cloned file is generated on the same node as the original file. However, in some instances a clone may be linked into the distributed file system on a different node from where the clone is to be created and the original file is located. Problems or failures that occur during generation of a clone involving such remote clone requests may result in resources being assigned to a clone that will not actually be used. Thus, according to embodiments, a cloning process is provided to enable a release of resources upon a determination that a cloning request has failed.

As an example, if a first node attempts to make a clone file (File F') corresponding to an original file (File F) at some point in time (T1), where both F and F' are stored on a second node. In order to properly provide and support the desired clone file (File F'), distributed file system problems need to be handled in a way that results in a clone based on the desired point in time (T1), or in the case of a failure, eventual release of resources associated with the failed operation.

In various examples described herein, an approach based on one or more of the following actions can be utilized to support remote cloning of files in a distributed file system environment:

1) A first node requests a clone (File F') of a file (File F) at a time (T1) when it also requests a full, exclusive delegation of the original file (File F) from a second node where the original file (File F) is stored.

2) The second node begins preparatory work for granting the first node a full, exclusive delegation of the original file (File F), which can also include recalling delegations of the original file (File F) from other nodes.

3) The second node marks the original file (File F) as delegated to the first node, which locks the file to a point in time (T1) until the first node is notified of the delegation and uses the delegation to manipulate the original file (File F) or returns the delegation. The second node also records an intent to create the clone file (File F') along with a delegation record for the clone file (File F'). The delegation precludes the original file (File F) from being changed by any entity except the recipient of the delegation, until such time as the delegation is later relinquished or revoked.

4) The second node creates the clone file (File F').

5) In response to creation of the clone file (File F'), the delegation of and the identity of the clone file (File F') is returned to the first node.

6) When the first node uses the clone file (File F'), the first node will mark in the delegation record that the clone file (File F') was committed.

7) When the delegation to the first node is returned, the second node checks to determine whether the first node indicated that it committed the clone file (File F') and, if so, the delegation is cleared and the clone file (File F') is kept (i.e., because something on the first node is referencing the clone file (File F')), and if the clone file (File F') was not committed, the delegation is cleared and the clone file (File F') is deleted.

The approach described herein provides several key properties to support and/or improve the remote cloning process. For example, after the second node marks the original file (File F) as delegated to the first node and the second node records an intent to create the clone file (File F') along with a delegation record for the clone file (File F'), only the first node can change the original file (File F) in a way that could cause the original file (File F) to no longer match the point in time when the clone file (File F') was created. Also, after the second node creates the clone file (File F'), only the first node and the second node are aware of the clone file (File F'), so no other nodes (e.g., Node C) know of the clone file (File F').

Thus, the second node can refuse to manipulate clones only referenced by delegation records. Additionally, the second node can refuse to grant conflicting delegations to other nodes until node B's already granted delegation is revoked or relinquished. Further, the first node can ensure the original file (File F) and the clone file (File F') match until the clone file (File F') is used by maintaining and respecting its logical (non-distributed) state for the ongoing operation and locally disallowing modifications to the delegated original file (File F) and by refraining from getting and modifying a delegation of the clone file (File F').

During operation, if the first node does not receive the delegation from the second node (e.g., RPC response is dropped by the network), the first node can re-request the delegation. The clone file (File F') can be created at that time if required (e.g., if it was not created because of a failure between 3) and 4) above). If a failure occurs before when the first node uses the clone file (File F'), the second node maintains enough state so that the second node can clean up resources associated with the clone file (File F') because the overall operation failed. The second node can recall delegations and if the first node did not record the delegation, the first node will not indicate to the second node that the clone file (File F') was not committed, and the second node will delete the clone file (File F').

FIG. 1 illustrates one embodiment of block diagram of a plurality of nodes interconnected as a cluster. The cluster of nodes illustrated in FIG. 1 can be configured to provide storage services relating to the organization of information on storage devices. The nodes of cluster 100 in FIG. 1 can be the types of nodes that request and perform the remote cloning of files as outlined above. That is, node 104 can be the first node in the example above, and node 106 can be the second node in the example above. In the example illustrated herein, clone 158 can be a clone of file 156 and can be handled according to the approaches described.

The nodes of FIG. 1 (e.g., node 104, node 106) include various functional components that cooperate to provide a distributed storage system architecture of cluster 100. To that end, each node is generally organized as a network element (e.g., network element 108 in node 104, network element 110 in node 106) and a disk element (e.g., disk element 112 in node 104, disk element 114 in node 106). The network elements provide functionality that enables the nodes to connect to client(s) 102 over one or more network connections (e.g., 118, 120), while each disk element connects to one or more storage devices (e.g., disk 134, disk array 146).

In the example of FIG. 1, disk element 112 connects to disk 134 and disk element 114 connection to 146 (which includes disk 144 and 148). Node 104 and node 106 are interconnected by cluster switching fabric 116 which, in an example, may be a Gigabit Ethernet switch. It should be noted that while there is shown an equal number of network and disk elements in cluster 100, there may be differing numbers of network and/or disk elements. For example, there may be a plurality of network elements and/or disk elements interconnected in a cluster configuration that does not reflect a one-to-one correspondence between the network and disk elements. As such, the description of a node comprising one network elements and one disk element should be taken as illustrative only.

Client(s) 102 may be general-purpose computers configured to interact with node 104 and node 106 in accordance with a client/server model of information delivery. That is, each client may request the services of a node, and the corresponding node may return the results of the services requested by the client by exchanging packets over one or more network connections (e.g., 118, 120).

Client(s) 102 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Disk elements (e.g., disk element 112, disk element 114) are illustratively connected to disks that may be individual disks (e.g., disk 134) or organized into disk arrays (e.g., disk array 146). Alternatively, storage devices other than disks may be utilized, e.g., flash memory, optical storage, solid state devices, etc. As such, the description of disks should be taken as exemplary only. As described below, in reference to FIG. 4, a file system may implement a plurality of flexible volumes on the disks. Flexible volumes may comprise a plurality of directories (e.g., directory 124, directory 136) and a plurality of subdirectories (e.g., sub 128, sub 140, sub 150, sub 152, sub 154). Junctions (e.g., junction 126, junction 130, junction 138) may be located in directories and/or subdirectories. It should be noted that the distribution of directories, subdirectories and junctions shown in FIG. 1 is for illustrative purposes. As such, the description of the directory structure relating to subdirectories and/or junctions should be taken as exemplary only.

Figure 2:
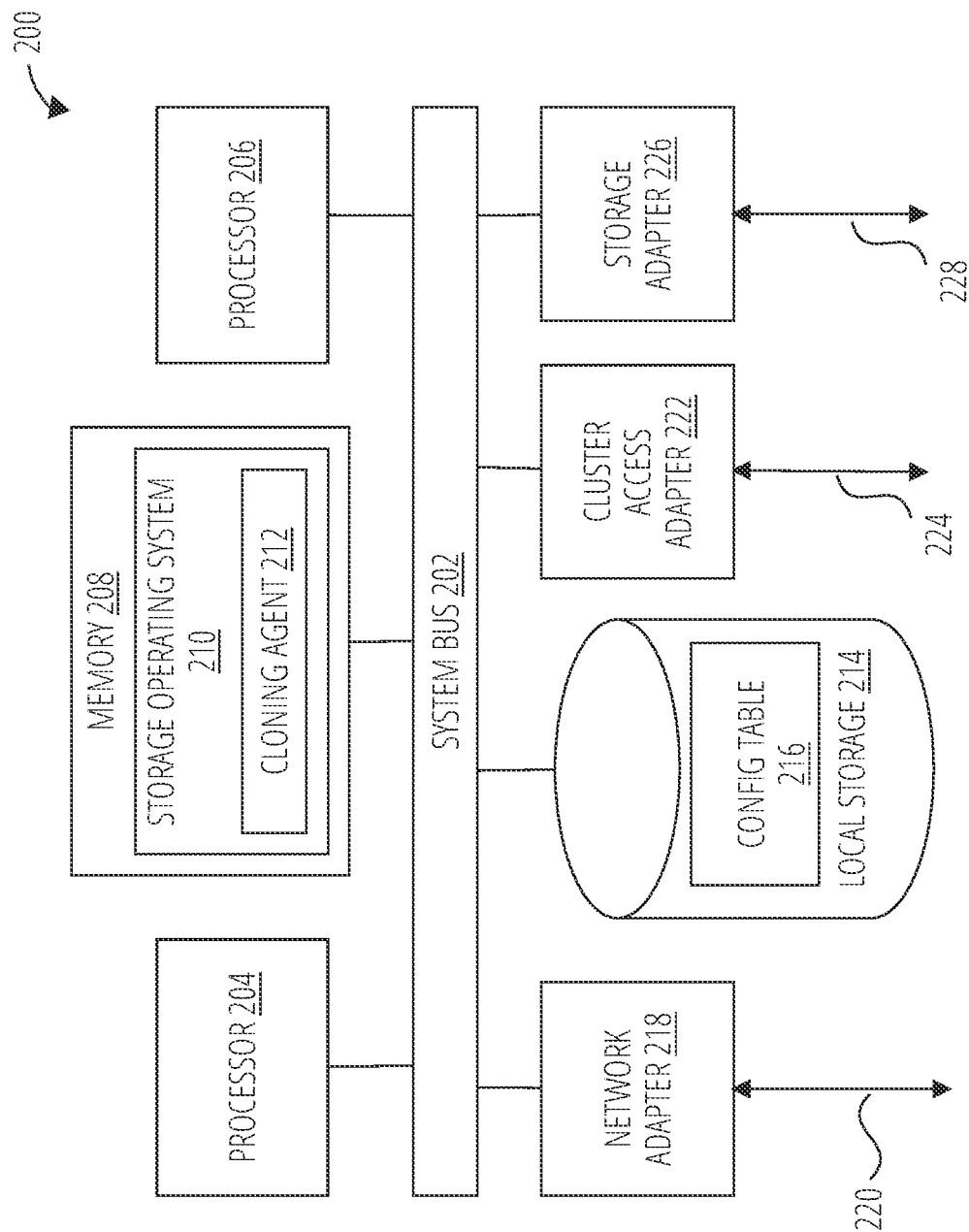
FIG. 2 illustrates one embodiment of a block diagram of a node.

FIG. 2 illustrates one embodiment of a block diagram of a node. Node 200 can be, for example, node 104 or node 106 as discussed in FIG. 1. In the example of FIG. 2, node 200 includes processor 204 and processor 206, memory 208, network adapter 218, cluster access adapter 222, storage adapter 226 and local storage 214 interconnected by 202. In an example, local storage 214 can be one or more storage devices, such as disks, utilized by the node to locally store configuration information (e.g., in config table 216).

Cluster access adapter 222 provides a plurality of ports adapted to couple node 200 to other nodes (not illustrated in FIG. 2) of a cluster. In an example, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, cluster access adapter 222 is utilized by the network element (e.g., network element 108, network element 110) and disk element (e.g., disk element 112, disk element 114) for communicating with other network elements and disk elements in the cluster.

In the example of FIG. 2, node 200 is illustratively embodied in a dual processor storage system executing storage operating system 210 that can implement a high-level module, such as a file system, to logically organize the information as a hierarchical structure of named directories, files and special types of files called virtual disks (hereinafter generally "blocks") on the disks. However, it will be apparent to those of ordinary skill in the art that node 200 may alternatively comprise a single or more than two processor system. In an example, processor 204 executes the functions of the network element on the node, while processor 206 executes the functions of the disk element.

In an example, memory 208 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. Storage operating system 210, portions of which is typically resident in memory and executed by the processing elements, functionally organizes node 200 by, inter alia, invoking storage operations in support of the storage service implemented by the node. It will be apparent to those skilled in the art that other processing and memory means, including various computer readable media, may be used for storing and executing program instructions pertaining to the disclosure described herein. In an example, storage operating system 210 includes cloning agent 212 that provides file cloning functionality as described herein.

In an example, network adapter 218 provides a plurality of ports adapted to couple node 200 to one or more clients (e.g., client(s) 102) over one or more connections 220, which can be point-to-point links, wide area networks, virtual private networks implemented over a public network (Internet) or a shared local area network. Network adapter 218 thus may include the mechanical, electrical and signaling circuitry needed to connect the node to the network. Illustratively, the computer network may be embodied as an Ethernet network or a Fibre Channel (FC) network. Each client may communicate with the node over network connections by exchanging discrete frames or packets of data according to pre-defined protocols, such as TCP/IP.

Storage adapter 226 cooperates with storage operating system 210 to access information requested by the clients. The information may be stored on any type of attached array of writable storage device media such as video tape, optical, DVD, magnetic tape, bubble memory, electronic random-access memory, micro-electromechanical and any other similar media adapted to store information, including data and parity information. However, as illustratively described herein, the information is stored on disks or an array of disks utilizing one or more connections 224. Storage adapter 226 provides a plurality of ports having input/output (I/O) interface circuitry that couples to the disks over an I/O interconnect arrangement, such as a conventional high-performance, FC link topology.

Storage of information on each array is preferably implemented as one or more storage "volumes" that comprise a collection of physical storage disks cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to disks, storage operating system 210 implements a write-anywhere file system that cooperates with one or more virtualization modules to "virtualize" the storage space provided by the disks. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (LUNs).

Illustratively, storage operating system 210 is the Data ONTAP® operating system available from NetApp™, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this disclosure.

Figure 3:
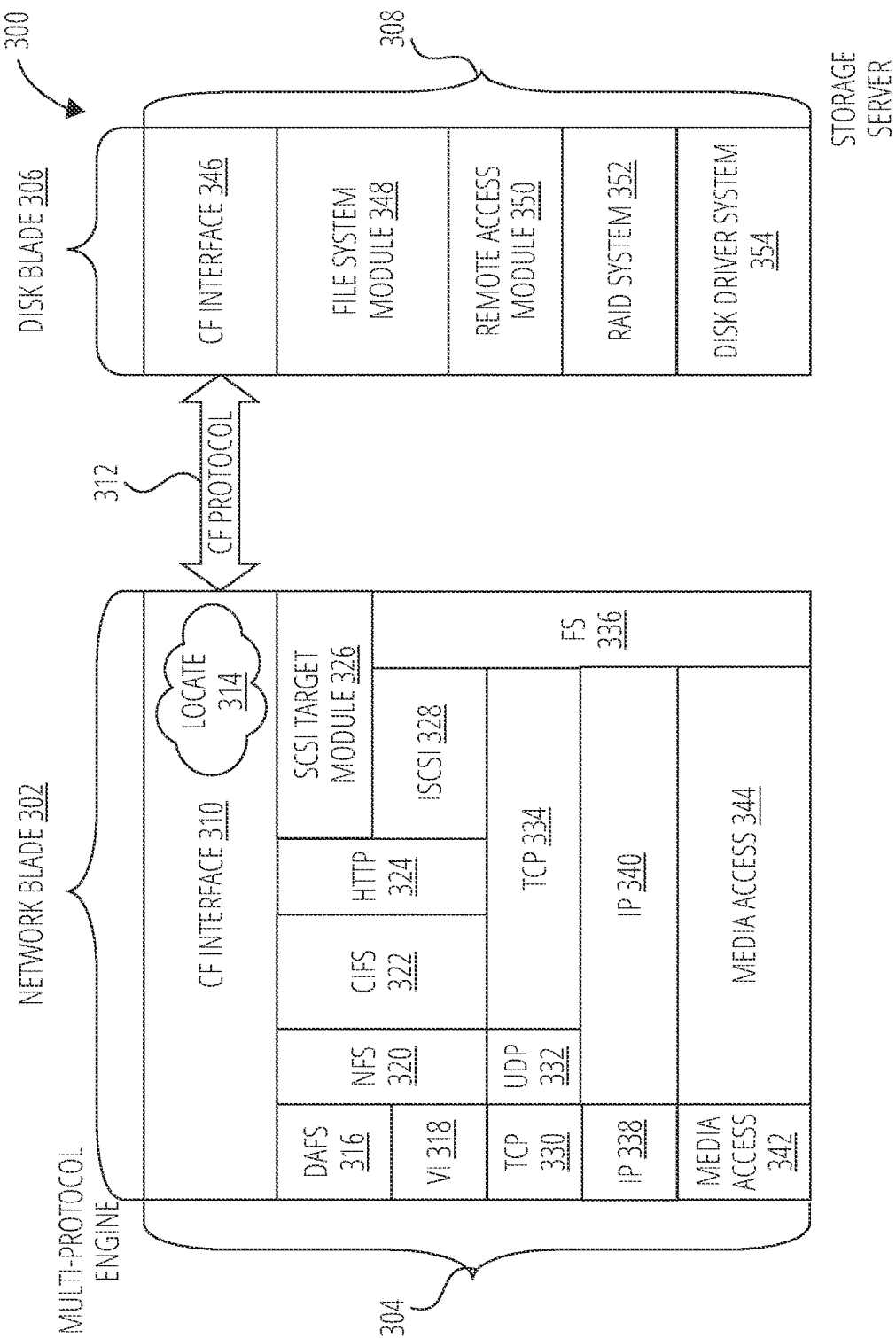
FIG. 3 illustrates one embodiment of a block diagram of a storage operating system.

FIG. 3 is a schematic block diagram of a storage operating system that may be advantageously used with the subject matter. Storage operating system 300 can utilize one or more of the layers and components illustrated to support the remote cloning functionality as described herein. As used herein, the term "storage operating system" generally refers to the computer-executable code operable on a computer to perform a storage function that manages data access and may, in the case of a node, implement data access semantics of a general-purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

Storage operating system 300 includes a series of software layers organized to form an integrated network protocol stack or, more generally, multi-protocol engine 304 that provides data paths for clients to access information stored on a node using block and file access protocols. In an example, multi-protocol engine 304 includes a media access layer (e.g., media access 342, media access 344) of network drivers (e.g., gigabit Ethernet drivers) that interfaces to network protocol layers, such as the Internet Protocol (IP) layer (e.g., IP 338, IP 340) and the corresponding supporting transport mechanisms, the Transport Control Protocol (TCP) layer (e.g., TCP 330, TCP 334) and the User Datagram Protocol (UDP) layer (e.g., UDP 332).

An example file system (FS) protocol layer (e.g., FS 336) provides multi-protocol file access and, to that end, includes support for Direct Access File System (DAFS) protocol (e.g., DAFS 316), Network File System (NFS) protocol (e.g., NFS 320), Common Internet File System (CIFS) protocol (e.g., CIFS 322) and the Hypertext Transfer Protocol (HTTP) (e.g., HTTP 324). Virtual Interface (VI) layer (e.g., VI 318) implements an architecture to provide direct access transport (DAT) capabilities, such as Remote Direct Memory Access (RDMA), to support Direct Access File System (DAFS) protocol (e.g., DAFS 316).

An Internet Small Computer Systems Interface (iSCSI) driver layer (e.g., iSCSI 328) provides block protocol access over TCP/IP network protocol layers, while a Cluster Fabric (CF) driver layer (e.g., CF interface 310) receives and transmits block access requests and responses to and from the node. In an example, the CF and iSCSI drivers provide CF-specific and iSCSI-specific access control to the blocks and, thus, manage exports of LUNs to either iSCSI or FCP or, alternatively, to both iSCSI and FCP when accessing the blocks on the node.

In addition, storage operating system 300 includes a series of software layers organized to form storage server 308 that provides data paths for accessing information stored on disks of a node. To that end, storage server 308 includes file system module 348 in cooperating relation with remote access module 350, RAID system 352 and disk driver system 354. RAID system 352 manages the storage and retrieval of information to and from the volumes/disks in accordance with I/O operations, while disk driver system 354 implements a disk access protocol such as, e.g., the SCSI protocol.

File system module 348 implements a virtualization system of storage operating system 300 through the interaction with one or more virtualization modules illustratively embodied as, e.g., a virtual disk (vdisk) module (not shown) and SCSI target module 326. SCSI target module 326 is generally disposed between the FC and iSCSI 328, file system 336 and file system 348 to provide a translation layer of the virtualization system between the block (LUN) space and the file system space, where LUNs are represented as blocks.

File system module 348 is illustratively a message-based system that provides logical volume management capabilities for use in access to the information stored on the storage devices, such as disks. That is, in addition to providing file system semantics, file system module 348 provides functions normally associated with a volume manager. These functions include (i) aggregation of the disks, (ii) aggregation of storage bandwidth of the disks, and (iii) reliability guarantees, such as mirroring and/or parity (RAID).

File system module 348 illustratively implements an exemplary a file system having an on-disk format representation that is block-based using, e.g., 4 kilobyte (kB) blocks and using index nodes ("inodes") to identify files and file attributes (such as creation time, access permissions, size and block location). File system module 348 uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded Modes, each of which may reference indirect blocks that, in turn, reference data blocks of a file.

Operationally, a request from a client is forwarded as a packet over a computer network and onto a node where it is received via a network adapter. A network driver processes the packet and, if appropriate, passes it on to a network protocol and file access layer for additional processing prior to forwarding to the write-anywhere file system. Here, the file system generates operations to load (retrieve) the requested data from disk if it is not resident "in core", i.e., in memory. If the information is not in memory, the file system indexes into the inode file using the inode number to access an appropriate entry and retrieve a logical vbn. The file system then passes a message structure including the logical vbn to, for example, RAID system 352; the logical vbn is mapped to a disk identifier and disk block number (disk,dbn) and sent to an appropriate driver (e.g., SCSI) of the disk driver system. The disk driver accesses the dbn from the specified disk and loads the requested data block(s) in memory for processing by the node. Upon completion of the request, the node (and operating system) returns a reply to the client over the network.

Remote access module 350 is operatively interfaced between file system module 348 and RAID system 352. Remote access module 350 is illustratively configured as part of the file system to implement the functionality to determine whether a newly created data container, such as a subdirectory, should be stored locally or remotely. Alternatively, remote access module 350 may be separate from the file system. As such, the description of remote access module 350 being part of the file system should be taken as exemplary only. Further, remote access module 350 determines which remote flexible volume should store a new subdirectory if a determination is made that the subdirectory is to be stored remotely. More generally, remote access module 350 implements the heuristics algorithms used for the adaptive data placement. However, it should be noted that the use of a remote access module should be taken as illustrative. In alternative aspects, the functionality may be integrated into the file system or other module of the storage operating system. As such, the description of remote access module 350 performing certain functions should be taken as exemplary only.

It should be noted that while the subject matter is described in terms of locating new subdirectories, the principles of the disclosure may be applied at other levels of granularity, e.g., files, blocks, etc. As such, the description contained herein relating to subdirectories should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by the node in response to a request issued by client 180. Alternatively, the processing elements of adapters (e.g., network adapter 218, storage adapter 226, cluster access adapter 222) may be configured to offload some or all of the packet processing and storage access operations, respectively, from the processor (e.g., processor 204, processor 206), to thereby increase the performance of the storage service provided by the node. It is expressly contemplated that the various processes, architectures and procedures described herein can be implemented in hardware, firmware or software.

It will be understood to those skilled in the art that aspects of the disclosure described herein may apply to any type of special-purpose (e.g., file server, filer or storage serving appliance) or general-purpose computer, including a stand-alone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

Illustratively, storage server 308 is embodied as disk blade 306 of storage operating system 300 to service one or more volumes of a disk array (e.g., disk array 146). In addition, multi-protocol engine 304 is embodied as network blade 302 to: (i) perform protocol termination with respect to a client issuing incoming data access request packets over a network, as well as (ii) redirect those data access requests to any storage server of the cluster. Moreover, network blade 302 and disk blade 306 cooperate to provide a highly scalable, distributed storage system architecture for a cluster (e.g., cluster 100). To that end, each module includes a cluster fabric (CF) interface module (e.g., CF interface 310, CF interface 346) adapted to implement intra-cluster communication among the modules (e.g., utilizing CF protocol 312), including disk element to disk element communication for data container striping operations, for example.

The protocol layers, e.g., the NFS/CIFS layers and the iSCSI/IFC layers, of network blade 302 function as protocol servers that translate file-based and block-based data access requests from clients into CF protocol messages used for communication with disk blade 306. That is, the network element servers convert the incoming data access requests into file system primitive operations (commands) that are embedded within CF messages by CF interface 310 for transmission to disk blade 306. Notably, CF interface 310 and CF interface 346 cooperate to provide a single file system image across all disk blades in a cluster. Thus, any network port of a network element that receives a client request can access any data container within the single file system image located on any disk element of the cluster.

Further, in an illustrative aspect of the disclosure, network blade 302 and disk blade 306 are implemented as separately scheduled processes of storage operating system 300; however, in an alternate aspect, the network blade 302 and disk blade 306 may be implemented as pieces of code within a single operating system process. Communication between a network element and disk element is thus illustratively affected through the use of message passing between the modules although, in the case of remote communication between a network element and disk element of different nodes, such message passing occurs over cluster switching fabric 116. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp™, Inc.

CF interface 310 and CF interface 346 implement a CF protocol for communicating file system commands among the modules of the cluster. Communication is illustratively affected by the disk element exposing the CF API to which a network element (or another disk element) issues calls. To that end, the CF interface modules are organized as a CF encoder and CF decoder. The CF encoder encapsulates a CF message as (i) a local procedure call (LPC) when communicating a file system command to a disk element residing on the same node or (ii) a remote procedure call (RPC) when communicating the command to a disk element residing on a remote node of the cluster. In either case, the CF decoder de-encapsulates the CF message and processes the file system command.

Illustratively, the remote access module may utilize CF messages to communicate with remote nodes to collect information relating to remote flexible volumes. A CF message is used for RPC communication over the switching fabric between remote modules of the cluster; however, it should be understood that the term "CF message" may be used generally to refer to LPC and RPC communication between modules of the cluster. The CF message includes a media access layer, an IP layer, a UDP layer, a reliable connection (RC) layer and a CF protocol layer. The CF protocol is a generic file system protocol that conveys file system commands related to operations contained within client requests to access data containers stored on the cluster; the CF protocol layer is that portion of a message that carries the file system commands. Illustratively, the CF protocol is datagram based and, as such, involves transmission of messages or "envelopes" in a reliable manner from a source (e.g., network blade 302) to a destination (e.g., disk blade 306). The RC layer implements a reliable transport protocol that is adapted to process such envelopes in accordance with a connectionless protocol, such as UDP.

In one embodiment, a data container is represented in the write-anywhere file system as an inode data structure adapted for storage on the disks 130. In such an embodiment, an inode includes a meta-data section and a data section. The information stored in the meta-data section of each inode describes the data container (e.g., a file) and, as such, includes the type (e.g., regular, directory, vdisk) of file, its size, time stamps (e.g., access and/or modification time) and ownership (e.g., user identifier (UID) and group ID (GID)), of the file, and a generation number. The contents of the data section of each inode may be interpreted differently depending upon the type of file (inode) defined within the type field. For example, the data section of a directory inode includes meta-data controlled by the file system, whereas the data section of a regular inode includes file system data. In this latter case, the data section includes a representation of the data associated with the file.

Specifically, the data section of a regular on-disk inode may include file system data or pointers, the latter referencing 4 KB data blocks on disk used to store the file system data. Each pointer is preferably a logical vbn to facilitate efficiency among the file system and the RAID system when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section of the inode (e.g., a second level inode) references an indirect block (e.g., a first level L1 block) that contains 1024 pointers, each of which references a 4 KB data block on disk. For file system data having a size greater than 64 MB, each pointer in the data section of the inode (e.g., a third level L3 inode) references a double-indirect block (e.g., a second level L2 block) that contains 1024 pointers, each referencing an indirect (e.g., a first level L1) block. The indirect block, in turn, which contains 1024 pointers, each of which references a 4 kB data block on disk. When accessing a file, each block of the file may be loaded from disk into the memory.

When an on-disk inode (or block) is loaded from disk into memory, its corresponding in-core structure embeds the on-disk structure. For example, the dotted line surrounding the inode indicates the in-core representation of the on-disk inode structure. The in-core structure is a block of memory that stores the on-disk structure plus additional information needed to manage data in the memory (but not on disk). The additional information may include, e.g., a "dirty" bit. After data in the inode (or block) is updated/modified as instructed by, e.g., a write operation, the modified data is marked "dirty" using the dirty bit so that the inode (block) can be subsequently "flushed" (stored) to disk.

According to one embodiment, a file in a file system comprises a buffer tree that provides an internal representation of blocks for a file loaded into memory and maintained by the write-anywhere file system. A root (top-level) inode, such as an embedded inode, references indirect (e.g., level 1) blocks. In other embodiments, there may be additional levels of indirect blocks (e.g., level 2, level 3) depending upon the size of the file. The indirect blocks (e.g., and inode) includes pointers that ultimately reference data blocks used to store the actual data of the file. That is, the data of file are contained in data blocks and the locations of these blocks are stored in the indirect blocks of the file. Each level 1 indirect block may include pointers to as many as 1024 data blocks. According to the "write anywhere" nature of the file system, these blocks may be located anywhere on the disks.

In one embodiment, a file system layout is provided that apportions an underlying physical volume into one or more virtual volumes (or flexible volume) of a storage system, such as node 200. In such an embodiment, the underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In a further embodiment, pvbns are used as block pointers within buffer trees of files stored in a flexible volume. This "hybrid" flexible volume example involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

In a dual vbn hybrid flexible volume example, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks.

A root (top-level) buffer, such as the data section embedded in an inode, references indirect (e.g., level 1) blocks. Note that there may be additional levels of indirect blocks (e.g., level 2, level 3) depending upon the size of the file. The indirect blocks (and inode) include pvbn/vvbn pointer pair structures that ultimately reference data blocks used to store the actual data of the file. The pvbns reference locations on disks of the aggregate, whereas the vvbns reference locations within files of the flexible volume. The use of pvbns as block pointers in the indirect blocks provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 4:
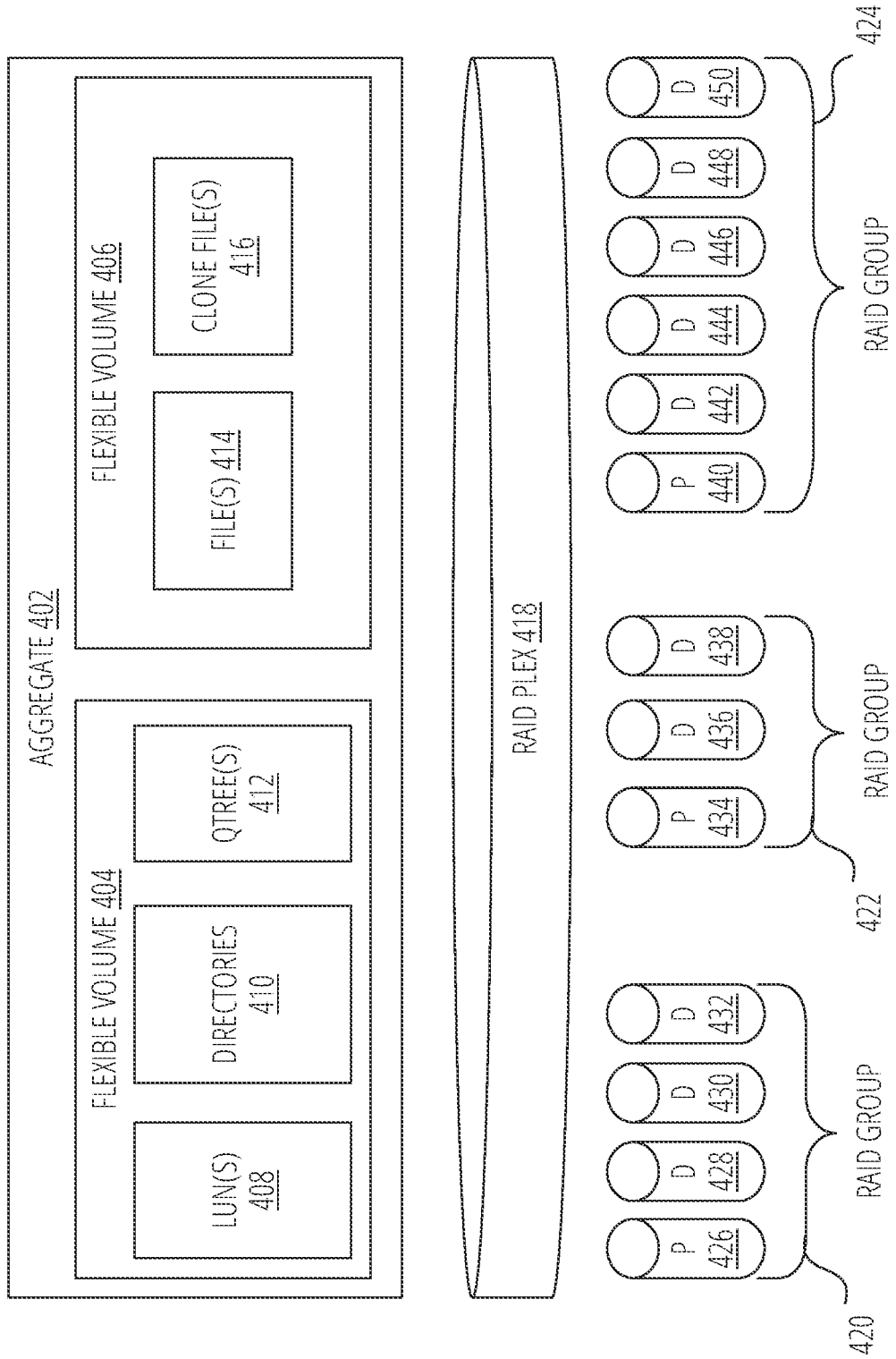
FIG. 4 illustrates one embodiment of a block diagram of an aggregate.

FIG. 4 illustrates one embodiment of a block diagram of an aggregate. In one embodiment, a file system layout is provided that apportions an underlying physical volume into one or more virtual volumes (or flexible volume) of a storage system. In such an embodiment, the underlying physical volume is an aggregate comprising one or more groups of disks, such as RAID groups, of the node. In an example, aggregate 402 has its own physical volume block number (pvbn) space and maintains meta-data, such as block allocation structures, within that pvbn space. Each flexible volume (e.g., flexible volume 404, flexible volume 406) has its own virtual volume block number (vvbn) sp ace and maintains meta-data, such as block allocation structures, within that vvbn space. Each flexible volume is a file system that is associated with a container file; the container file is a file in aggregate 402 that contains all blocks used by the flexible volume. Moreover, each flexible volume comprises data blocks and indirect blocks that contain block pointers that point at either other indirect blocks or data blocks.

LUN(s) 408, directories 410, Qtree(s) 412, file(s) 414, clone file(s) 416 may be included within flexible volume 404 and/or flexible volume 406, such as dual vbn flexible volumes, that, in turn, are contained within aggregate 402. In one embodiment, flexible volume 404 and/or flexible volume 406 including elements within the flexible volumes may comprise junctions to provide redirection information to other flexible volumes, which may be contained within aggregate 402, may be stored in aggregate service by other key modules in the distributed file system. As such, the description of elements being stored within a flexible volume should be taken as exemplary only. Aggregate 402 is illustratively layered on top of the RAID system, which is represented by at least one RAID plex 418 (depending upon whether the storage configuration is mirrored), wherein each RAID plex 418 includes at least one RAID group (e.g., RAID group 420, RAID group 422, RAID group 424). Each RAID group further comprises a plurality of disks, one or more data (D) disks (e.g., 428, 430, 432, 436, 438, 442, 444, 446, 448, 450) and at least one (P) parity disk (e.g., 426, 434, 440).

Whereas aggregate 402 is analogous to a physical volume of a conventional storage system, a flexible volume (e.g., flexible volume 404, flexible volume 406) is analogous to a file within that physical volume. That is, aggregate 402 may include one or more files, wherein each file contains a flexible volume and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume is also a logical volume, it has its own block allocation structures (e.g., active, space and summary maps) in its vvbn space.

A container file is a file in the aggregate that includes all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden metadata root directory that contains subdirectories of flexible volumes.

Specifically, a physical file system directory includes a subdirectory for each flexible volume in the aggregate, with the name of subdirectory being a file system identifier (fsid) of the flexible volume. Each fsid subdirectory (flexible volume) contains at least two files, a file system file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 5:
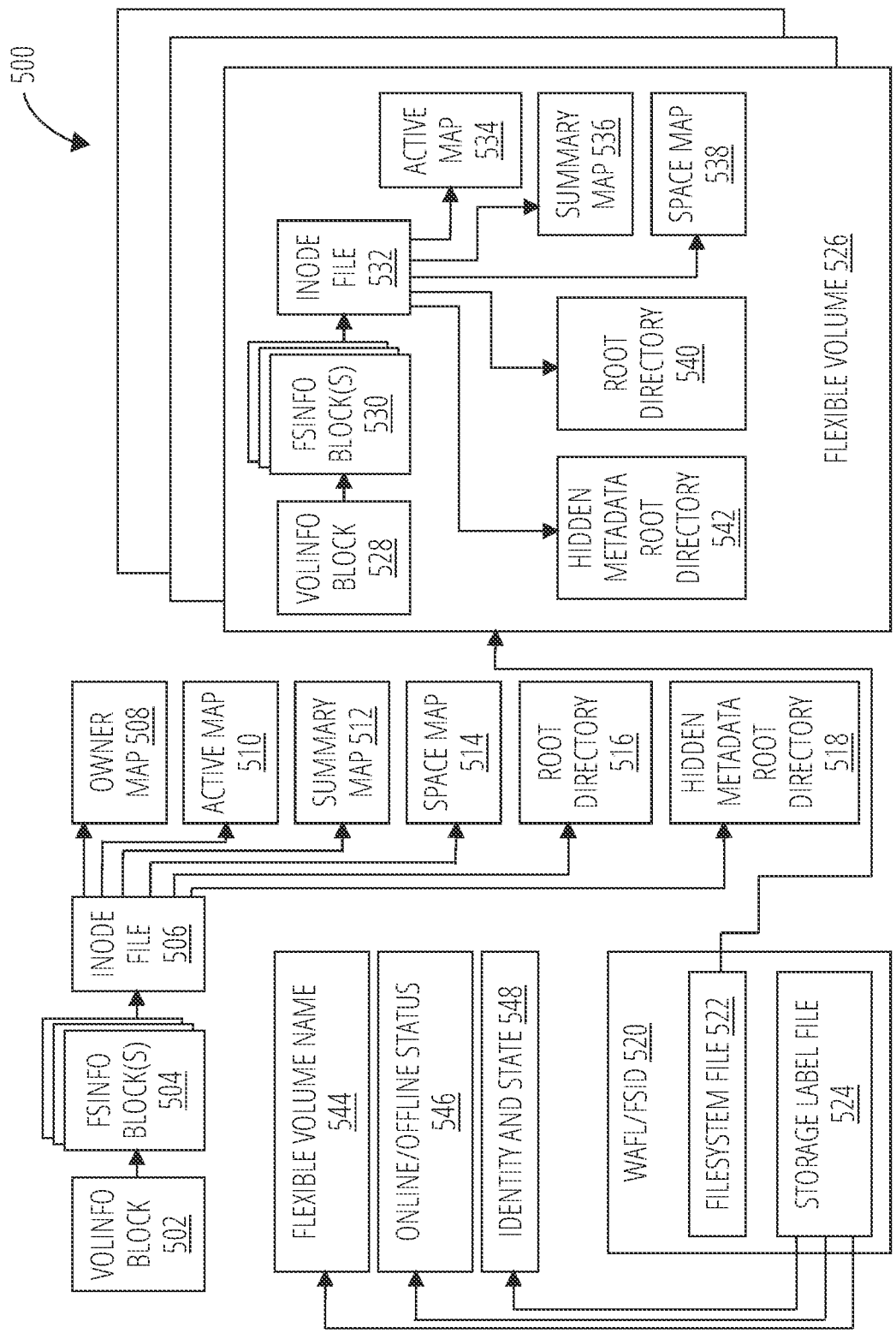
FIG. 5 illustrates one embodiment of a block diagram of an on-disk layout of the aggregate.

FIG. 5 illustrates one embodiment of a block diagram of an on-disk layout of an aggregate. The storage operating system (e.g., storage operating system 210) utilizes the RAID system (e.g., RAID system 352), to assemble a physical volume of pvbns to create an aggregate (e.g., aggregate 402), with pvbns 1 and 2 comprising a "physical" volinfo block 502 for the aggregate. In an example, volinfo block 502 contains block pointers to fsinfo block(s) 504, each of which may represent a snapshot of the aggregate. Each fsinfo block(s) 504 includes a block pointer to an Mode file 506 that contains modes of a plurality of files, including owner map 508, active map 510, summary map 512 and space map 514, as well as other special meta-data files. Inode file 506 further includes root directory 516 and hidden metadata root directory 518, the latter of which includes a namespace having files related to a flexible volume in which users cannot "see" the files. In an example, hidden metadata root directory 518 includes the WAFL/fsid/directory structure (WAFL/fsid 520) that contains filesystem file 522 and storage label file 524. In an example, root directory 516 in the aggregate is empty; files related to the aggregate are organized within hidden metadata root directory 518.

In addition to being embodied as a container file having level 1 blocks organized as a container map, filesystem file 522 includes block pointers that reference various file systems embodied as one or more flexible volume 526. The aggregate maintains these flexible volumes at special reserved inode numbers. In an example, each flexible volume 526 also has reserved inode numbers within its flexible volume space that are used for, among other things, the block allocation bitmap structures. As noted, the block allocation bitmap structures, e.g., active map 534, summary map 536 and space map 538, are located in each flexible volume.

Specifically, each flexible volume 526 has the same inode file structure/content as the aggregate, with the exception that there is no owner map and no WAFL/fsid/file system file, storage label file directory structure in hidden metadata root directory 542. To that end, each flexible volume 526 has volinfo block 528 that points to one or more fsinfo block(s) 530, each of which may represent a snapshot, along with the active file system of the flexible volume. Each fsinfo block, in turn, points to an inode file 532 that, as noted, has the same inode structure/content as the aggregate with the exceptions noted above. Each flexible volume 526 has its own inode file 532 and distinct inode space with corresponding inode numbers, as well as its own root directory 540 and subdirectories of files that can be exported separately from other flexible volumes.

Storage label file 524 contained within hidden metadata root directory 518 of the aggregate is a small file that functions as an analog to a conventional RAID label. A RAID label includes physical information about the storage system, such as the volume name; that information is loaded into storage label file 524. Illustratively, storage label file 524 includes the flexible volume name 544 of the associated flexible volume 526, online/offline status 546 of the flexible volume, and identity and state 548 of the associated flexible volume (whether it is in the process of being created or destroyed).

As discussed above, initial placement of files within a group of flexible volumes (or constituents) comprising the distributed file system is determined based on heuristics. However, over time factors, such as file size and file operations (fileop) load, may change to such a degree that the original placement may become sub-optimal. Thus, file distribution may need to be rebalanced without disrupting access to client files. In embodiments, such non-disruptive file movement implements a redirection layer to move a file between constituents while preserving the directory entry and the client file handles. In such embodiments, the redirection layer uses multipart inodes to facilitate non-disruptive file movement between constituents. As used herein, a multipart inode is defined as a LUN, VM, object, file, etc. that employs more than one WAFL inode to store its content that operate in conjunction with one another.

Figure 6:
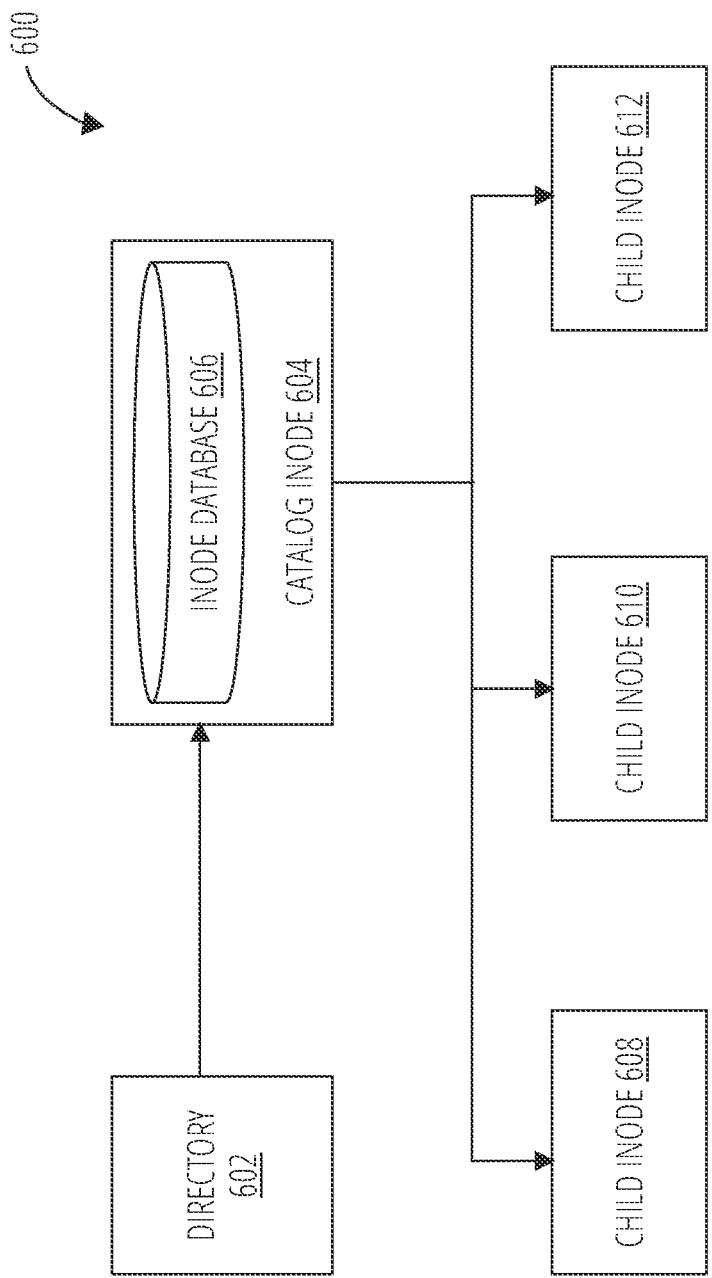
FIG. 6 illustrates one embodiment of a block diagram of a redirection layer.

FIG. 6 illustrates one embodiment of a block diagram of a redirection layer. In an example, redirection layer 600 includes directory 602 that points to catalog inode 604. In one embodiment, catalog inode 604 includes inode database 606 that operates as a multipart catalog that lists a plurality of child inodes (e.g., child inode 608, child inode 610, child inode 612). In such an embodiment, the child inodes each store components of file data such that a first component of data may be stored in child inode 608, a second component of data may be stored in child inode 610, a third component of data may be stored in child inode 612, etc. As a result, a conceptual location of a file may be disassociated with the actual location of the stored data.

As discussed above, a problem may occur during cloning. For example, the data within the child inodes must be tracked and cloned to complete file cloning. Moreover, catalog inode 604 and one or more of the child inodes may be physically located in different nodes. Further, problems or failures that occur during generation of a clone involving such remote clone requests may result in resources being assigned to a clone that will not actually be used. According to one embodiment, a process is disclosed to facilitate remote cloning in a distributed file system implementing a redirection layer.

Figure 7A:
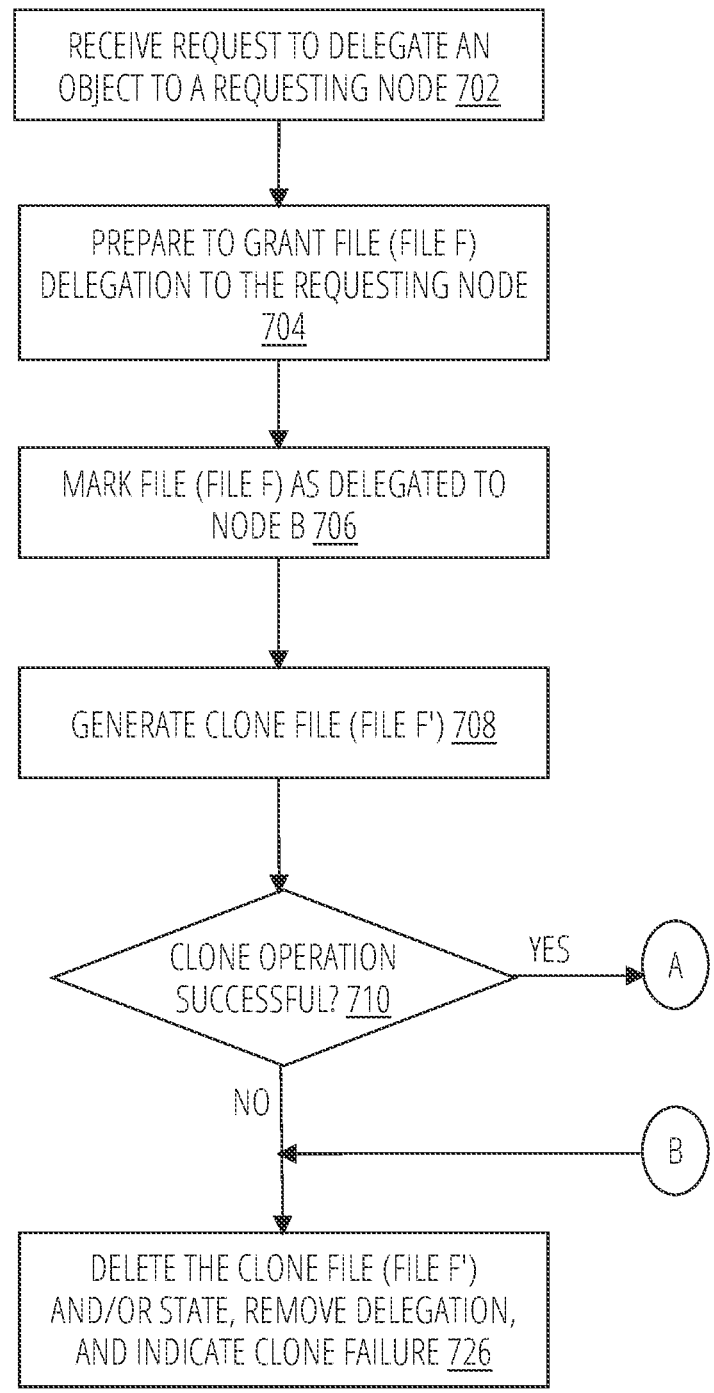
FIG. 7A is a first portion of a flow diagram illustrating one embodiment of a cloning process.

FIG. 7A is a first portion of a flow diagram illustrating one embodiment of a cloning process. In an example, the cloning process is performed within a distributed storage system (e.g., FIG. 1, FIG. 2, FIG. 3, FIG. 4 and/or FIG. 5) that utilizes an indirection layer (e.g., FIG. 6) where a conceptual location of a file may be disassociated with the actual location of the stored data.

At block 702, a node (e.g., Node A) receives a request from a different node (e.g., Node B) to make a clone file (File F') of a file (File F). In one embodiment, Node B requests the clone of File F at the same time as Node B requests a full (e.g., read and write), exclusive delegation of File F from Node A. As used in herein, a delegation is a process by which a node (e.g., Node A) delegates management of a local file to a remote node (e.g., Node B). Thus, in an example, Node B is requesting Node A to make a clone of File F (i.e., File F') and relinquish full control of File F to Node B to change content of the File F.

At block 704, Node A performs preparatory operations for granting Node B a full exclusive delegation of File F. In one embodiment, such preparatory operations include, for example, Node A reclaiming any other delegations of File F to ensure that another remote node (e.g., Node C) does not currently have a delegation of File F. Other and/or different preparatory operations can also be performed.

At block 706, Node A marks File F as delegated to Node B, which locks File F until Node B is made aware of the delegation and uses the delegation to manipulate File F, Node B releases the delegation, or Node A reclaims the delegation. Additionally, Node A will record an intent to create clone File F' together with its delegation record. At this stage of the process only Node B may change File F in any way that could cause File F to no longer match the point in time at which clone File F' is requested.

At block 708, Node A generates the clone File F' of File F. At this point, only Node A is aware of clone File F'. According to one embodiment, Node B can re-request the delegation if, for any reason, Node B does not receive the delegation from Node A (e.g., due to a remote procedure call (RPC) response dropped by the network). In such an embodiment, clone File F' may be generated at that time if required (e.g., clone was not created because of a failure between block 706 and block 708).

At decision block 710, a determination is made as to whether generation of the clone File F' is successful. If not, the clone, or a state associated with an intent to clone, is deleted, block 726 and a response is sent to Node B indicating the delegation of File F was not granted and a clone of File F was not created. Otherwise, Node A sends a response to Node B indicating that the delegation was granted and the identity of clone File F', block 712 (FIG. 7B).

Figure 7B:
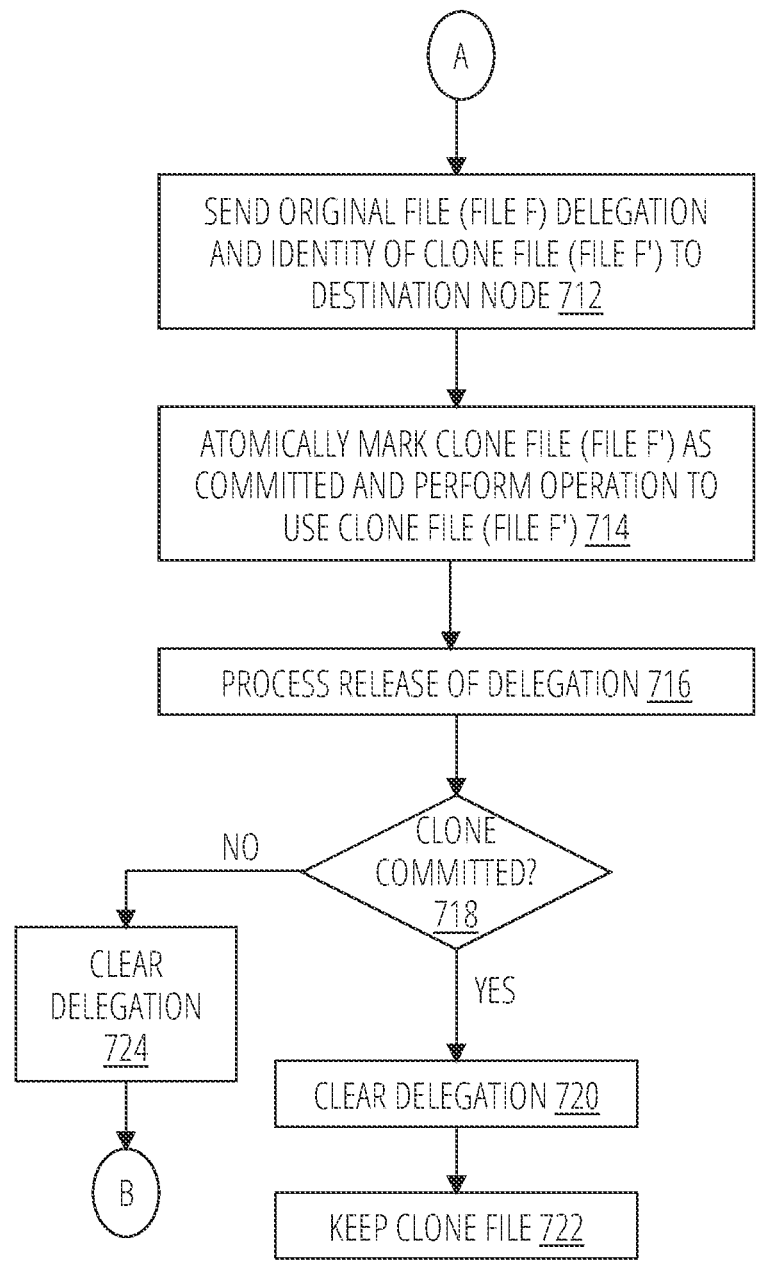
FIG. 7B is a second portion of a flow diagram illustrating one embodiment of a cloning process.

FIG. 7B is a second portion of a flow diagram illustrating one embodiment of a cloning process. At this point (block 712), only Node A and Node B are aware of clone File F' (e.g., node C is unaware of the identity of clone File F'). In one embodiment, Node A may refuse to manipulate clones only referenced by delegation records. Thus, Node B can ensure File F and clone File F' match until clone File F' is used by maintaining and respecting its local (non-distributed) state for the ongoing operation, locally disallowing modifications to delegated File F and refraining from receiving and modifying a delegation of clone File F'.

At block 714, Node B accepts the clone File F' by atomically marking in its delegation record that the clone File F' is committed and performing one or more operations that make use of the clone. Note that the operation of block 714 occurs on Node B while the remaining operations illustrated in FIG. 7B occur on Node A. Because of this, the operation of block 714 is somewhat independent from the remaining operations. The example of FIG. 7B illustrates one potential flow; however, alternative flows (described in greater detail below) can occur while providing the overall functionality described herein.

An atomic set of operations is a set of operations that have all-or-none semantics. In one embodiment, this means that either: 1) Node B neither uses clone File F' nor marks that clone File F' was committed in its delegation record; or 2) Node B both uses clone File F' and marks that clone File F' was committed in its delegation record. Node B using the clone File F' creates a dependency on the clone File F'. Thus, by also marking clone File F' as committed, Node B ensures the dependency is not violated by Node A deleting the clone File F' when the delegation of File F is reclaimed.

Thus, conceptually, Node B is stealing the reference to the clone File F' when it marks clone File F' as committed. The clone File F' becomes the responsibility of Node B to manage going forward because Node A will no longer be expected to do any cleanup corresponding to the clone File F'. Node B uses clone File F' by modifying data stored on Node B to reference the clone File F'. That modification of data on Node B can be, for example, modification of a directory, or the catalog inode of a redirection layer to reference the clone File F'.

At block 716, Node A receives notification that Node B is releasing the delegation of File F. In one embodiment, Node A maintains sufficient state to clean up resources associated with clone File F' due to a failure in the overall operation that occurs prior to block 716. In such an embodiment, Node A uses a conventional mechanism for reclaiming delegations to accomplish the cleanup. There are multiple conditions that may cause Node B's delegation to be reclaimed. One such condition is a third node (e.g., Node C) requesting a delegation of File F. While Node B has an outstanding delegation, Node A can reclaim Node B's delegation so it can give a new delegation to Node C. Reclaiming a delegation generally involves requesting the revocation from the node holding the delegation. Thus, Node A can reclaim the delegation by requesting that Node B allow the reclamation.

Alternatively, Node A could have a timer or garbage collection process that periodically examines outstanding delegations and reclaims them based on age, for example, or some other criteria. In any case, after Node A identifies a delegation should be reclaimed, Node A will proceed with reclaiming the delegation. In one embodiment, Node A sends a callback message to the node with the delegation (Node B), telling that node to release the delegation. In other embodiments, the delegations might take the form of leases, where delegations are only valid for a limited period of time. In this case, the delegation is implicitly released when the lease expires.

For example, if Node B has chosen to commit the clone File F', Node B will be expected to "write back" its commitment to Node A and will not relinquish its delegation until Node A has acknowledged success. If Node B has not yet committed the clone File F', Node B will discard its own memory of the delegation and return success, allowing Node A to clear the existing delegation (and delete the unused clone). Only when this existing delegation is resolved in one of these manners, can a new delegation be granted to a different caller (e.g., Node C).

Under certain conditions the release of delegation (i.e., block 716) can occur before the operation to use the clone file is performed (i.e., block 714). Both the use of clone File F' by Node B and the conditions that can trigger release of Node A's delegation of File F to Node B may occur asynchronously with respect to processing on Node A once the delegation is granted at block 712. For example, the release trigger can happen before Node B is able to use the clone File F', such that block 714 will not execute and Node A would continue at block 716. Additionally, Node B may encounter a failure or other condition that prevents it from executing block 714, again resulting in Node A proceeding to block 716. Thus, conceptually, there may be an evaluation between block 712 and block 714 that, under the described conditions, causes the delegation to be released before clone File F' is used and marked as committed.

At decision block 718, a determination is made at Node A whether Node B has indicated that Node B has committed clone File F'. This determination occurs as the delegation of File F to Node B is released. This may be attributed to Node A reclaiming the delegation. However, it may be that Node B wants to proactively release the delegation because it does not need it anymore (e.g., it has finished its use of clone File F'). In one embodiment, the communication from Node B to Node A indicating that Node B is releasing the delegation has an additional field indicating whether the clone File F' associated with the delegation was committed. If the field is included and is set to a true value, the clone File F' is committed.

Upon a determination that that clone File F' was committed at Node B at decision block 718, Node A clears the delegation of File F to Node B, block 720. And, at block 722, Node A keeps clone File F' (e.g., because some element at Node B is referencing clone File F'). Otherwise, Node A clears the delegation, block 724, prior to returning control to block 726 (in FIG. 7A) where the clone File F' is deleted.

Conceptually, the functionality of Node A as described herein can be considered a service that responds to requests. The requests can be generated internally, or the requests can be generated by other nodes and transmitted to Node A. The service functionality of Node A can respond to a "Get Delegation (with Clone)" or similar request with the operations as described with respect to block 702, block 704, block 706, block 708, decision block 710, block 712 and block 726. The service functionality of Node A can respond to a "Release Delegation (with Clone)" or similar request with the operations as described with respect to block 716, decision block 718, block 720, block 722, block 724 and block 726. Because the "Release Delegation (with Clone)" request can occur at any time, it may occur before the independent and asynchronous process on Node B (i.e., block 714) uses the clone and marks it as committed.

Figure 8:
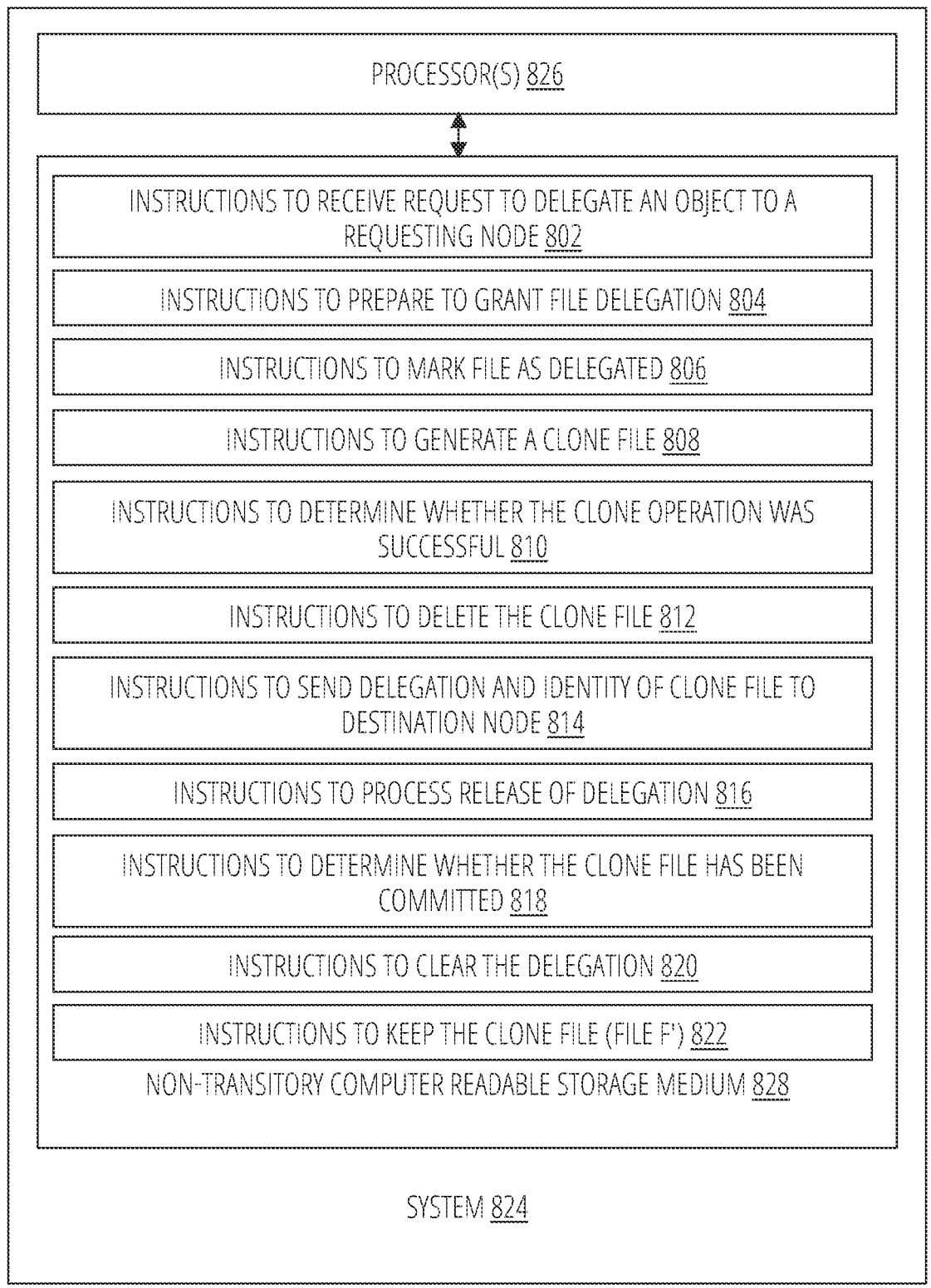
FIG. 8 is an example of a system to provide a process for remote cloning.

FIG. 8 is an example of a system to provide a process for remote cloning. In an example, system 824 can include processor(s) 826 and non-transitory computer readable storage medium 828. In an example, processor(s) 826 and non-transitory computer readable storage medium 828 can be part of a node (e.g., node 200) having a storage operating system (e.g., storage operating system 210) that can provide some or all of the functionality of the ONTAP software as mentioned above.

Non-transitory computer readable storage medium 828 may store instructions 802, 804, 806, 808, 810, 812, 814, 816, 818, 820 and 822 that, when executed by processor(s) 826, cause processor(s) 826 to perform various functions. Examples of processor(s) 826 may include a microcontroller, a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer readable storage medium 828 include tangible media such as random-access memory (RAM), read-only memory (ROM), electrically erasable programmable read-only memory (EEPROM), flash memory, a hard disk drive, etc.

Instructions 802 cause processor(s) 826 to receive, with a node (e.g., Node A) a request from a different node (e.g., Node B) to make a clone file (File F') of File F. In one embodiment, Node B requests the clone of F (i.e., File F') at the same time as that Node B also requests a full (e.g., read and write), exclusive delegation of File F from Node A. Thus, in an example, Node B requests that Node A make a clone of File F (i.e., File F') and relinquish full control of File F to Node B to change content of the File F.

Instructions 804 cause processor(s) 826 to cause Node A to perform preparatory operations for granting Node B a full exclusive delegation of File F. In one embodiment, such preparatory operations include Node A reclaiming other delegations of File F to ensure that another remote node (e.g., Node C) does not currently have a delegation of File F. Other and/or different preparatory operations can also be performed.

Instructions 806 cause processor(s) 826 to cause Node A to mark File F as delegated to Node B, which locks File F until Node B is made aware of the delegation and uses the delegation to manipulate File F, Node B releases the delegation, or Node A reclaims the delegation. Additionally, Node A records an intent to create clone File F' together with its delegation record. At this stage of the process only Node B may change File F in any way that could cause File F to no longer match the point in time at which clone File F' is requested.

Instructions 808 cause processor(s) 826 to cause Node A to generate the clone File F' of File F. At this point, only Node A is aware of clone File F'. According to one embodiment, Node B can re-request the delegation if, for any reason, Node B does not receive the delegation from Node A (e.g., due to a remote procedure call (RPC) response dropped by the network). In such an embodiment, clone File F' may be generated at that time if required (e.g., clone was not created because of a failure with respect to instructions 806 and/or instructions 808).

Instructions 810 cause processor(s) 826 to determine whether the clone operation was successful.

Instructions 812 cause processor(s) 826 to delete the clone, or a state associated with an intent to clone if the clone operation was not successful (e.g., as determined by instructions 810) and a response is sent to Node B indicating the delegation of File F was not granted and a clone of File F was not created.

Instructions 814 cause processor(s) 826 to cause Node A to send a response to Node B indicating that the delegation was granted and the identity of clone File F' if the clone operation was successful (e.g., as determined by instructions 810).

Instructions 816 cause processor(s) 826 to cause Node A to receive notification that Node B is releasing the delegation of File F. In one embodiment, Node A maintains sufficient state to clean up resources associated with clone File F' due to a failure in the overall operation that occurs prior to release of the delegation. There are multiple conditions that may cause Node B's delegation to be reclaimed. One such condition is a third node (e.g., Node C) requesting a delegation of File F. While Node B has an outstanding delegation, Node A can reclaim Node B's delegation so it can give a new delegation to Node C.

Alternatively, instructions 816 as executed by processor(s) 826 can provide Node A with a timer or garbage collection process that periodically examines outstanding delegations and reclaims them based on age, for example, or some other criteria. In any case, after Node A identifies a delegation should be reclaimed, Node A will proceed with reclaiming the delegation. In one embodiment, Node A sends a callback message to the node with the delegation (Node B), telling that node to release the delegation. In other embodiments, the delegations might take the form of leases, where delegations are only valid for a limited period of time. In this case, the delegation is implicitly released when the lease expires.

Instructions 818 cause processor(s) 826 to determine whether the clone file has been committed. This determination occurs as the delegation of File F to Node B is released. This may be attributed to Node A reclaiming the delegation. However, it may be that Node B wants to proactively release the delegation because it does not need it anymore (e.g., it has finished its use of clone File F'). In one embodiment, the communication from Node B to Node A indicating that Node B is releasing the delegation has an additional field indicating whether the clone File F' associated with the delegation was committed. If the field is included and is set to a true value, the clone File F' is committed.

Instructions 820 cause processor(s) 826 to clear the delegation of File F to Node B in response to a determination that that clone File F' was committed at Node B (e.g., instructions 818). Instructions 822 cause processor(s) 826 to cause Node A to keep clone File F' (e.g., because some element at Node B is referencing clone File F').

In response to a determination that that clone File F' was not committed at Node B (e.g., instructions 818), Node A clears the delegation (e.g., instructions 820) prior to returning control to instructions 812 where the clone File F' is deleted.

Embodiments may be implemented as any or a combination of one or more microchips or integrated circuits interconnected using a parent board, hardwired logic, software stored by a memory device and executed by a microprocessor, firmware, an ASIC, and/or FPGA. The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The terms "component", "module", "system," and the like as used herein are intended to refer to a computer-related entity, either software-executing general-purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disc), ROM (read only memory), floppy disk, hard disk, EEPROM (electrically erasable programmable read only memory), memory stick or any other storage device type, in accordance with the claimed subject matter.

What is claimed is:

1. A node in a distributed storage system having plurality of interconnected nodes, the node comprising:
   network interfaces to allow communication to and from remote nodes in the plurality of interconnected nodes;
   a memory device to store instructions;
   a processor coupled with the memory device and with the network interfaces, the processor to execute instructions stored in the memory device including instructions that cause the processor to:
   receive a clone request from a remote node, the clone request for a clone of a file stored on the node;
   perform one or more preparatory operations prior to granting a file delegation for the file to the remote node;
   mark the file as delegated to the remote node;
   generate the clone of the file;
   transmit, to the remote node, delegation information corresponding to the file and identity information corresponding to the clone of the file;
   initiate processing to release the delegation of the file in response to a release trigger;
   clear the delegation of the file to the remote node;
   keep the clone file if the clone file has been committed; and
   delete the clone file if the clone file has not been committed.

2. The node of claim 1 wherein the distributed storage system utilizes a block-based format having fixed-size blocks and index nodes (inodes) to identify files and file attributes.

3. The node of claim 2 wherein the distributed storage system utilizes a redirection layer that comprises at least a directory that points to a catalog inode that includes an inode database that operates as a multipart catalog that lists a plurality of child inodes that each store components of the file.

4. The node of claim 3 wherein the clone of the file comprises data from multiple child inodes in the plurality of child inodes.

5. The node of claim 1 further comprising deleting the clone file and state information associated with the clone file, if any, in response to an indication that generation of the clone file was not completely successful.

6. The node of claim 1 wherein the distributed storage system is a container-based system in which each node exists within a corresponding container.

7. The node of claim 1 wherein the remote node atomically marks the clone file as committed and performs an operation having a dependency on the clone file.

8. A non-transitory computer readable storage medium having stored thereon instructions that, when executed by one or more processors, cause the one or more processors to:
   receive a clone request from a remote node, the clone request for a clone of a file stored on a selected node;
   perform one or more preparatory operations prior to granting a file delegation for the file to the remote node;
   mark the file as delegated to the remote node;
   generate the clone of the file;
   transmit, to the remote node, delegation information corresponding to the file and identity information corresponding to the clone of the file;
   initiate processing to release the delegation of the file in response to a release trigger;
   clear the delegation of the file to the remote node;
   keep the clone file if the clone file has been committed; and
   delete the clone file if the clone file has not been committed.

9. The non-transitory computer readable storage medium of claim 8 wherein a distributed storage system comprising at least the remote node and the selected node utilizes a block-based format having fixed-size blocks and index nodes (inodes) to identify files and file attributes.

10. The non-transitory computer readable storage medium of claim 9 wherein the distributed storage system that a redirection layer that comprises at least a directory that points to a catalog inode that includes an inode database that operates as a multipart catalog that lists a plurality of child inodes that each store components of the file.

11. The non-transitory computer readable storage medium of claim 10 wherein the clone of the file comprises data from multiple child inodes in the plurality of child inodes.

12. The non-transitory computer readable storage medium of claim 8 further comprising instructions that, when executed, cause the one or more processors to delete the clone file and state information associated with the clone file, if any, in response to an indication that generation of the clone file was not completely successful.

13. The non-transitory computer readable storage medium of claim 8 wherein a distributed storage system comprising at least the remote node and the selected node is a container-based system in which each node exists within a corresponding container.

14. The non-transitory computer readable storage medium of claim 8 further comprising instructions that, when executed, cause the one or more processors to cause the remote node to atomically mark the clone file as committed and performs an operation having a dependency on the clone file.

15. A method for managing a node in a distributed storage system having plurality of interconnected nodes, the method comprising:
   receiving a clone request from a remote node, the clone request for a clone of a file stored on the node;
   performing one or more preparatory operations prior to granting a file delegation for the file to the remote node;
   marking the file as delegated to the remote node;
   generating the clone of the file;
   transmitting, to the remote node, delegation information corresponding to the file and identity information corresponding to the clone of the file;
   initiating processing to release the delegation of the file in response to a release trigger;
   clearing the delegation of the file to the remote node;
   keeping the clone file if the clone file has been committed; and
   deleting the clone file if the clone file has not been committed.

16. The method of claim 15 wherein the distributed storage system utilizes a block-based format having fixed-size blocks and index nodes (inodes) to identify files and file attributes.

17. The method of claim 15 wherein the remote node is part of the distributed storage system that utilizes a redirection layer that comprises at least a directory that points to a catalog inode that includes an inode database that operates as a multipart catalog that lists a plurality of child inodes that each store components of the file.

18. The method of claim 15 wherein the clone of the file comprises data from multiple child inodes.

19. The method of claim 15 wherein the remote node atomically marks the clone file as committed and performs an operation having a dependency on the clone file.

20. The method of claim 15 wherein the distributed storage system is a container-based system in which each node exists within a corresponding container.

* * * * *